(12) United States Patent  
Doerr

(10) Patent No.: US 7,106,923 B1
(45) Date of Patent: Sep. 12, 2006

(54) DISPERSION COMPENSATOR

(75) Inventor: Christopher Richard Doerr, Middletown, NJ (US)

(73) Assignee: Lucent Technologies, Inc, Murray Hill, NJ (US)

( * ) Notice: Subject to any disclaimer, the term of this patent is extended or adjusted under 35 U.S.C. 154(b) by 1 day.

(21) Appl. No.: 11/096,022

(22) Filed: Mar. 31, 2005

(51) Int. Cl.
*G02B 6/00* (2006.01)
*G02B 6/36* (2006.01)

(52) U.S. Cl. .......................... 385/15; 385/39; 398/115
(58) Field of Classification Search ................ 385/15, 385/27, 37, 39, 40–42, 129, 132, 2, 13, 16; 356/479; 398/115, 118
See application file for complete search history.

(56) References Cited

U.S. PATENT DOCUMENTS

| | | | |
|---|---|---|---|
| 6,690,855 B1* | 2/2004 | Thompson et al. | 385/27 |
| 6,785,446 B1* | 8/2004 | Chandrasekhar et al. | 385/39 |
| 2002/0102052 A1* | 8/2002 | Thompson et al. | 385/27 |
| 2004/0239943 A1* | 12/2004 | Izatt et al. | 356/479 |

* cited by examiner

*Primary Examiner*—Akm Enayet Ullah

(74) *Attorney, Agent, or Firm*—Brosemer, Kolefas & Associates, LLC

(57) ABSTRACT

Dispersion compensator apparatus comprising 1XM, MXN and NXN couplers, where the coupling ratios of the MXN and NXN couplers are selected such that the dispersion compensator provides a desired amount of dispersion compensation.

19 Claims, 4 Drawing Sheets

DISPERSION COMPENSATOR

CROSS-REFERENCE TO RELATED APPLICATION

This application relates to applications entitled "TUNABLE DISPERSION COMPENSATOR", application Ser. No. 10/664,340, filed Sep. 17, 2003, and "TUNABLE DISPERSION COMPENSATOR", application Ser. No. 10/760,516, filed Jan. 20, 2004, which are incorporated herein by reference.

BACKGROUND OF THE INVENTION

1. Field of the Invention

The present invention generally relates to the field of optical communications and, more particularly, to apparatus for dispersion compensation.

2. Description of Related Art

Dispersion compensators (DCs) are widely used for compensating for chromatic dispersion in optical communication networks. Tunable dispersion compensators (TDCs) are used to provide an adjustable (i.e., tunable) amount of dispersion compensation. Previously proposed TDCs include, for example, ring resonators, virtually imaged phased arrays (VIPAs), cascaded Mach-Zehnder interferometers (MZIs), temperature-tuned etalons, waveguide grating routers (WGRs) with thermal lenses, and bulk gratings with deformable mirrors.

The cascaded MZI approach has been found to be particularly promising since it exhibits low loss and can be made with standard silica waveguides in a compact planar lightwave circuit (PLC). However, prior art MZI-based TDCs typically require multiple stages and multiple control voltages, are difficult to fabricate, and have high power consumption, making them complex and expensive.

One prior art design for a TDC is shown in FIG. 1a. The TDC consists of two M-arm interferometers (i.e., waveguide grating routers, WGRs #1 and #2), each consisting of M waveguides (i.e., arms) with adjacent waveguide path-length difference $\Delta L$, and two star couplers. The two WGRs are coupled together at one of their star coupler boundaries with an adjustable lens device. The combination of the two star couplers and the lens can be viewed as an adjustable coupler. The adjustable lens device is a dynamic 2-D element that can provide a quadratic phase distribution $-kx^2/(2f)$, where k is the free-space propagation constant, x is the distance along the lens axis, and f is the focal length. f may be controllable to allow tuning of the TDC. The strength, s, of the lens device is defined as $s=1/f$. When the lens focal length f is equal to the star coupler radius, the coupling is zero, (i.e., each waveguide connected to one of the star couplers couples to only one waveguide of the other star coupler (in a diagonal fashion).

The operation of the TDC in FIG. 1a can be explained as follows: for a given input signal (input from the left), the signal is spread out in wavelength at the lens device by WGR #1. Each spectral portion of the signal impinges on a different portion of the lens device. When the focal length of the lens device is equal to the length of the star coupler radius, all of the spectral portions of the signal are directed such that the field distribution of the spectral portions is centered in the waveguide array in WGR #2. Thus all the spectral portions have the same effective path length in the TDC, and thus, the dispersion of the TDC is zero.

If the focal length of the lens is adjusted to be longer than the radius of the star coupler, longer-wavelengths of the signal (as compared to wavelengths closer to the signal's center wavelength) are predominantly directed toward the shorter waveguides of WGR #2, and shorter-wavelengths are predominantly directed toward the longer waveguides of WGR #2. This results in longer-wavelengths traveling a shorter distance through the TDC than shorter-wavelengths, resulting in the TDC providing negative chromatic dispersion. If the lens focal length is adjusted to be shorter than the star coupler radius, the converse is true and the TDC provides positive chromatic dispersion.

One problem with the prior art TDC of FIG. 1a is that shorter- and longer-wavelengths experience increased loss (i.e., the TDC exhibits a rounded passband) with increased dispersion magnitude because the field distribution of the spectral portions of shorter- and longer-wavelengths are not centered in the waveguide array in WGR #2. Thus, these spectral portions do not couple efficiently into the output waveguide causing the rounded passband.

Another prior art TDC design shown in FIG. 1b solves the passband rounding problem of the TDC of FIG. 1a. The TDC of FIG. 1b has three MZIs each consisting of 2 waveguides, and two adjustable lenses coupling the MZI's. The two 'outer' MZIs have an adjacent waveguide path-length difference of $\Delta L$, and the center MZI has a waveguide path-length difference of $2\Delta L$. The passband of this TDC is not rounded (to the first order) as the dispersion magnitude is increased. However, with such MZI based TDCs the maximum achievable dispersion is substantially limited.

BRIEF SUMMARY OF THE INVENTION

The present invention provides an apparatus for dispersion compensation, which can be advantageously implemented in a planar lightwave circuit (PLC), making it compact, reliable, mass-producible, and all solid-state. In one preferred embodiment a DC comprises a first 1XM coupler, a first MXN coupler coupled to the first 1XM coupler, a second MXN coupler coupled to the first MXN coupler, and a second 1 XM coupler coupled to the second MXN coupler. M and N are greater than 2 so as to increase the maximum achievable dispersion of the DC. The coupling ratios of the first and second MXN couplers are selected such that the DC provides a desired amount of dispersion compensation.

In another preferred embodiment a DC is provided which comprises a first 1XM coupler, a first MXN coupler coupled to the first 1XM coupler, at least one NXN coupler(s) coupled in series to the first MXN coupler, a second MXN coupler coupled to the at least one NXN coupler(s), and a second 1XM coupler coupled to the second MXN coupler. The 1XM couplers are respectively coupled to the MXN couplers using an array of M waveguides having an adjacent waveguide path-length difference of about $\Delta L$. The MXN couplers and the NXN couplers are respectively coupled using an array of N waveguides having an adjacent waveguide path-length difference of about $2\Delta L$. The coupling ratios of the first MXN coupler, the at least one NXN coupler(s), and the second MXN coupler are selected such that the dispersion compensator provides a desired amount of dispersion compensation.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown.

In the drawings.

DETAILED DESCRIPTION OF THE INVENTION

Figure 1:
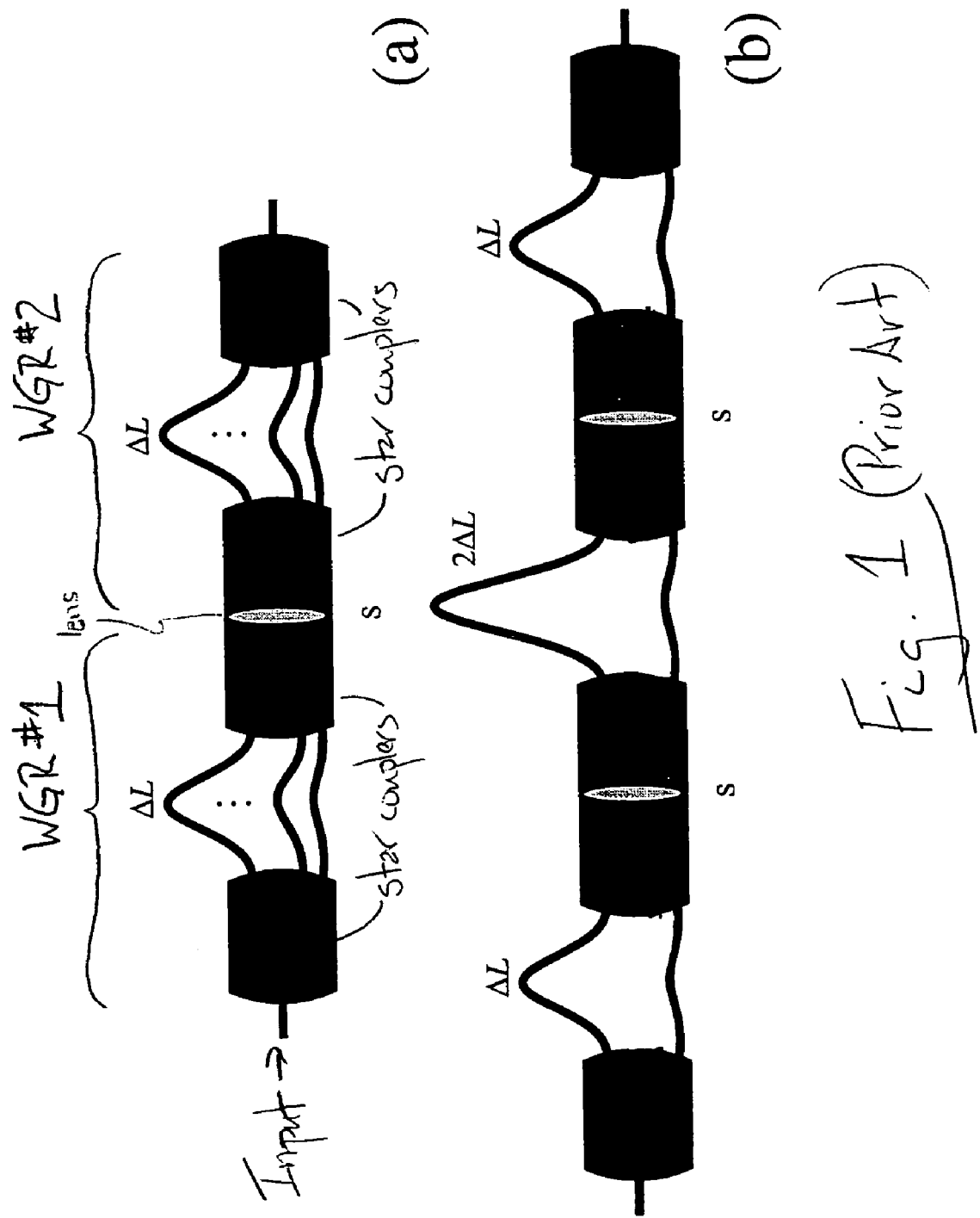
FIGS. 1a–b are prior art TDCs.
Figure 2:
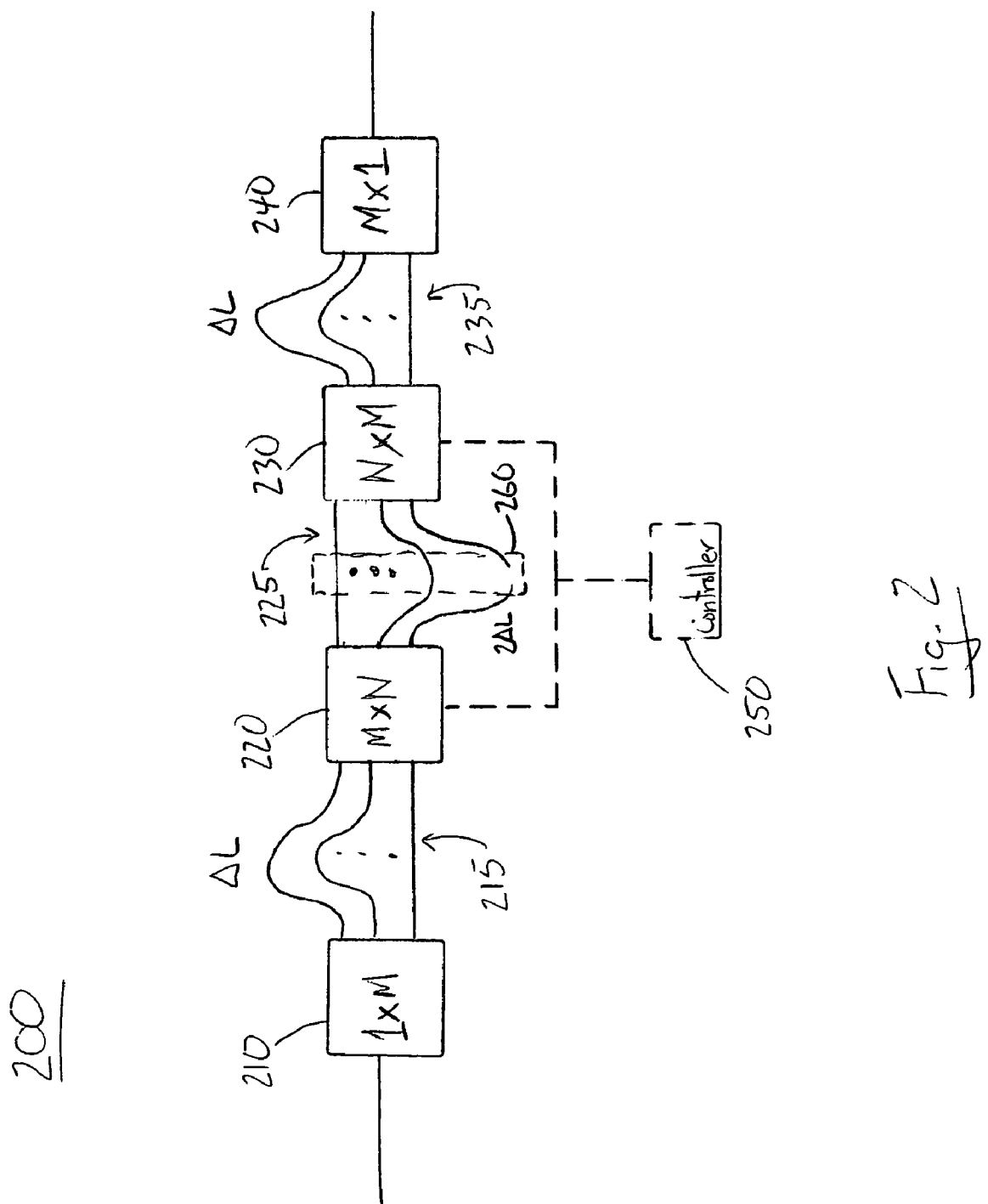
FIG. 2 is a schematic diagram of one embodiment of a DC according to the present invention.

FIG. 2 is a schematic diagram of a DC 200 according to one embodiment of the present invention. The DC 200 exhibits a wider and flatter passband as compared to prior art DCs while also providing increased maximum achievable dispersion compensation. The DC 200 preferably comprises a first 1XM coupler 210, a first MXN coupler 220 coupled to the first 1XM coupler 210, a second MXN coupler 230 coupled to the first MXN coupler 220, and a second 1 XM coupler 240 coupled to the second MXN coupler 230.

The first 1XM coupler 210 and the first MXN coupler 220 are coupled using an array of M waveguides 215 having an adjacent waveguide path-length difference of about $\Delta L$. The second MXN coupler 230 and the second 1XM coupler 240 are coupled using an array of M waveguides 235 also having an adjacent waveguide path-length difference of about $\Delta L$. The first MXN coupler 220 and the second MXN coupler 230 are coupled using an array of N waveguides 225 having an adjacent waveguide path-length difference of about $2\Delta L$. M and N are not necessarily equal, and are greater than 2. Preferably N is greater than or equal to M to reduce the loss of the DC 200 when the dispersion is non-zero. It is understood that by increasing the number of waveguides (i.e., increasing M, N greater than 2) in the arrays of waveguides 215, 225, 235, the maximum achievable dispersion of the DC 200 can be increased (given a fixed bandwidth). Increasing the number of waveguides also provides a wider and flatter passband for the DC 200.

The MXN couplers 220, 230 preferably comprise two star couplers operatively coupled with a means for controlling the coupling of light through the star couplers. The means for controlling the coupling may be, for example, a lens means positioned at the star coupler boundaries, as will be discussed below with reference to FIGS. 4a–b.

The coupling ratios of the first MXN coupler 220 and the second MXN coupler 230 are preferably selected such that the dispersion compensator 200 provides a desired amount of dispersion compensation (as discussed below).

In preferred embodiments of the invention the coupling ratios of the first MXN coupler 220 and the second MXN coupler 230 are adjustable to thereby allow control the amount of dispersion provided by the dispersion compensator 200 (i.e., to tune or vary the amount of dispersion compensation), making the dispersion compensator 200 a TDC.

Figure 4:
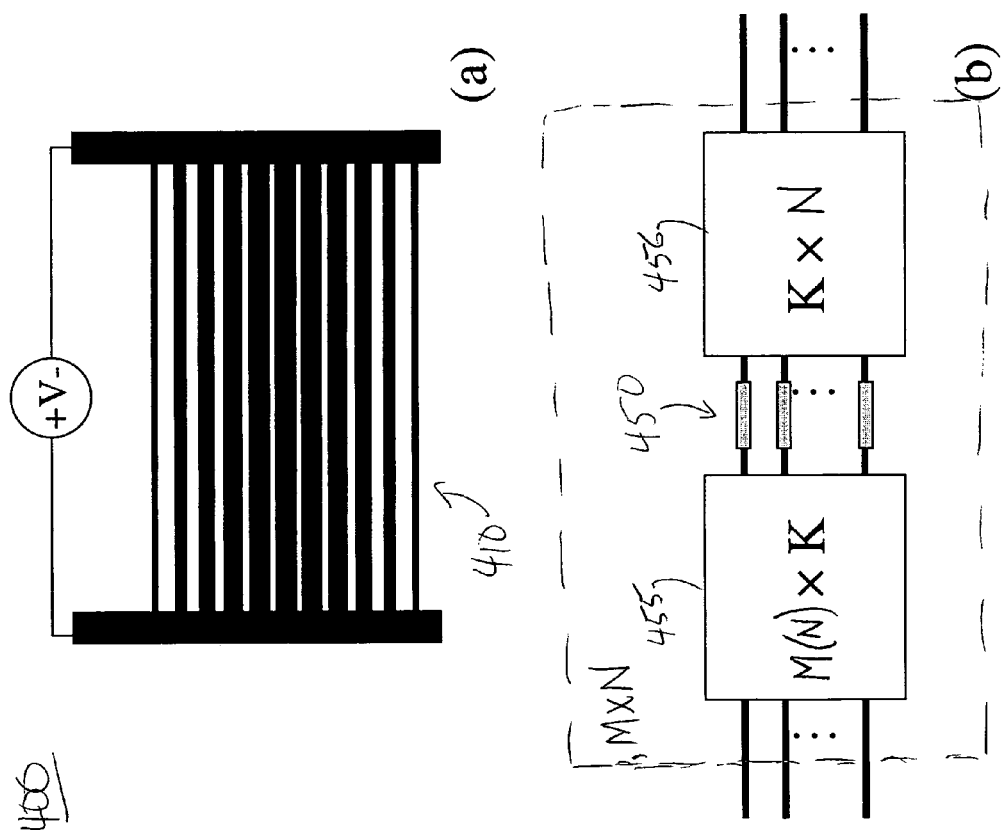
FIGS. 4a–b are implementations of lens means which can be used in DCs in according to the present invention.

In one preferred embodiment the first MXN coupler 220 and the second MXN coupler 230 each include an adjustable lens means (not shown in FIG. 2) for controlling their coupling ratios. The adjustable lens means may comprise, for example, a thermo-optic lens as shown in FIG. 4a, or the like. The thermo-optic lens of FIG. 4a includes strips of heaters 410 designed to give a quadratic distribution in index change, like a lens, when current is passed through the heaters. The strength of the lens is proportional to the electrical power driving the lens.

Alternatively, the MXN couplers 220, 230 and the adjustable lens means may be implemented using K phase shifters 450 coupled between MXK couplers 455, 456, as illustrated in the MXN coupler of FIG. 4b. (The MXN coupler of FIG. 4b may also be implemented as an NXN coupler for use with embodiments discussed below with reference to FIG. 3.) The K phase shifters 450 are preferably driven with a quadratic distribution, like a lens. Preferably K>M. The strength of the lens is controlled by the amplitude of the quadratic phase distribution.

In embodiments where the MXN couplers 220, 230 are adjustable, the MXN couplers 220, 230 may be adjusted or controlled using a controller 250 (shown in FIG. 2). The controller 250 preferably provides a single drive signal to, the MXN couplers 220, 230 to control the coupling ratio of the MXN couplers 220, 230 (e.g., to control an adjustable lens means), thereby adjusting the amount of dispersion provided by the dispersion compensator 200.

For positive dispersion compensation the coupling ratios of the first and second MXN couplers 220, 230 are preferably selected (or controlled) such that longer wavelengths of light propagated through the couplers (e.g., from an array of M waveguides (215 or 235) to the array of N waveguides 225) are substantially coupled to longer waveguides in the array of N waveguides 225. Thus the longer the wavelength, the longer it takes to propagate through the device, resulting in positive dispersion.

For negative dispersion compensation the coupling ratios of the first and second MXN couplers 220, 230 are preferably selected (or controlled) such that shorter wavelengths of light propagated through the couplers (e.g., from an array of M waveguides (215 or 235) to the array of N waveguides 225) are substantially coupled to longer waveguides in the array of N waveguides 225. Thus, the shorter the wavelength, the longer it takes to propagate through the device, resulting in negative dispersion.

In another preferred embodiment, the dispersion compensator 200 further comprises a half-wave plate 260 operatively coupled between the first and second MXN couplers 220, 230 such that the dispersion compensator provides substantially polarization-independent dispersion compensation. This is because the waveplate causes the two eigenpolarizations to be exchanged halfway through the device.

Those skilled in the art will appreciate that DCs employing an increased number of waveguides in the arrays of waveguides coupling the 1XM and MXN couplers may exhibit undesirable phase errors due to the increasingly long path lengths. Specifically, increasing the number of waveguides in the arrays of waveguides increases the resolution of the DC. Path-length errors (e.g., due to fabrication problems) may result in losses that increase exponentially with increases in resolution. Thus, there is a trade off between the benefits of increasing the number of waveguides in the DC (i.e., to obtain a wider and flatter passband and less signal distortion) and the detriment of increased sensitivity to fabrication imperfections with higher resolution DCs.

Figure 3:
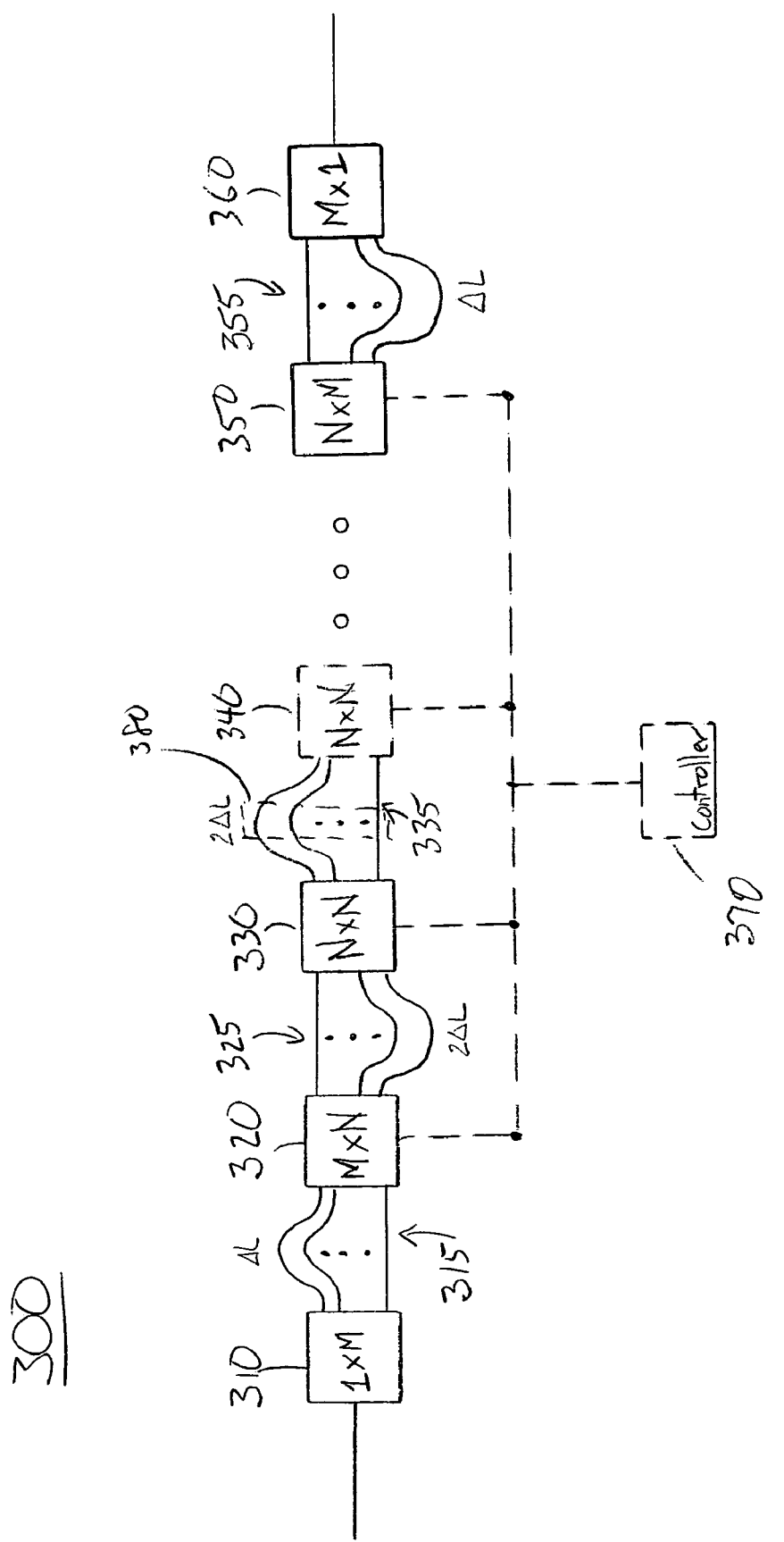
FIG. 3 is a schematic diagram of another embodiment of a DC according to the present invention.

In another preferred embodiment of the present invention, shown in FIG. 3, a DC 300 is provided which addresses the phase error problems discussed above. Without increasing the number of arms in the waveguide arrays, and by adding more couplers and waveguide arrays to the DC, the maximum achievable dispersion can increased with significantly reduced sensitivity to the phase error problems discussed above.

The DC 300 preferably comprises a first 1XM coupler 310, a first MXN coupler 320 coupled to the first 1 XM coupler 310, at least one NXN coupler(s) 330, 340 coupled in series to the first MXN coupler 320, a second MXN coupler 350 coupled to the at least one NXN coupler(s) (330, 340), and a second 1XM coupler 360 coupled to the second MXN coupler 350.

The first 1XM coupler 310 and the first MXN coupler 320 are coupled using an array of M waveguides 315 having an adjacent waveguide path-length difference of about ΔL. The second MXN coupler 350 and the second 1XM coupler 360 are coupled using an array of M waveguides 355 also having an adjacent waveguide path-length difference of about ΔL.

The first and second MXN couplers 320, 350 are respectively coupled to the at least one NXN coupler(s) (330, 340) using an array of N waveguides (e.g., 325) having an adjacent waveguide path-length difference of about 2ΔL.

In embodiments having more than one NXN coupler, the NXN couplers (e.g., 330, 340) are coupled using an array of N waveguides (e.g., 335) having an adjacent waveguide path-length difference of about 2ΔL.

The coupling ratios of the first MXN coupler 320, the at least one NXN coupler(s) (330, 340), and the second MXN coupler are preferably selected such that the dispersion compensator 300 provides a desired amount of dispersion compensation (as discussed below).

In preferred embodiments of the invention the first MXN coupler 320, the at least one NXN coupler(s) (330, 340), and the second MXN coupler 350 are adjustable. Specifically, the coupling ratios of the couplers are adjustable to thereby allow control of the amount of dispersion provided by the dispersion compensator 300 (i.e., to tune or vary the amount of dispersion compensation); making the dispersion compensator 300 a TDC. Preferably the control is accomplished by a single control signal, simplifying the TDC's characterization and operation.

In preferred embodiments the couplers (320, 330, 340, . . . 350) are adjustable using, for example, the adjustable lens means discussed above with reference to FIG. 2, or the like. The couplers (320, 330, 340, . . . 350) may be adjusted or controlled using a controller 370. Preferably, the first MXN coupler 320 and the second MXN coupler are driven with a drive signal having a total signal strength s+so, and the at least one NXN coupler(s) (330, 340) are driven using a drive signal having a total signal strength γs+$s_o$, where s is the drive signal strength, and so is the strength of the drive signal which controls the coupling ratio of the couplers such that the DC 300 provides zero dispersion compensation. Preferably, γ≧1, and more preferably, y is about 2. Those skilled in the art will appreciate that since the MXN couplers 320, 350 couple waveguide arrays (315, 355) with a centered field distribution to waveguide arrays (e.g., 325) with an off-center field distribution. Whereas the NXN coupler(s) (330, 340) couple waveguide arrays (e.g., 325, 335) both having off-center field distributions. Thus, the NXN couplers (330, 340) need stronger 'lens strengths' than the MXN couplers (320, 350) to properly perform the desired coupling.

To provide positive dispersion compensation the coupling ratios of the first and second MXN couplers 320, 350 are selected such that longer wavelengths of light propagated through an MXN coupler (e.g., MXN coupler 320) to the at least one NXN coupler(s) (e.g., NXN coupler 330) are substantially coupled to longer waveguides of an array of N waveguides (e.g., array of N waveguides 325) coupled to the MXN coupler (e.g., MXN coupler 320). Also, the coupling ratios of the at least one NXN coupler(s) (330, 340) are selected such that longer wavelengths of light propagated through the at least one NXN coupler(s) (330, 340) are substantially coupled to longer waveguides of an array of N waveguides coupled to the at least one NXN coupler(s) (330, 340), respectively.

To provide negative dispersion compensation the coupling ratios of the first and second MXN couplers 320, 350 are selected such that shorter wavelengths of light propagated through an MXN coupler (e.g., MXN coupler 320) to the at least one NXN coupler(s) (e.g., NXN coupler 330) are substantially coupled to longer waveguides of an array of N waveguides (e.g., array of N waveguides 325) coupled to the MXN coupler (e.g., MXN coupler 320). Also, the coupling ratios of the at least one NXN coupler(s) (330, 340) are selected such that shorter wavelengths of light propagated through the at least one NXN coupler(s) (330, 340) are substantially coupled to longer waveguides of an array of N waveguides coupled to the at least one NXN coupler(s) (330, 340), respectively.

As discussed above with reference to FIG. 2, the DC 300 of FIG. 3 may further comprise a half-wave plate 380 operatively coupled between the at least one NXN coupler(s) (330, 340) such that the dispersion compensator 300 provides substantially polarization-independent dispersion compensation. Those skilled in the art will appreciate that to achieve substantially polarization-independent dispersion compensation the half-wave plate must be positioned along an axis of symmetry of the DC 300.

Those skilled in the art will appreciate that the DC 300 of FIG. 3 may be implemented as a simplified arrangement where only 2 waveguides are used to couple each of the couplers (310, 320, 330, 340, . . . 350, 360) (i.e., M and N are 2).

Those skilled in the art will further appreciate that the embodiments discussed above may be equivalently implemented in a reflective (bidirectional) configuration (discussed in the cross-referenced related applications cited above), employing a mirror and a circulator, as is commonly done in planar lightwave circuit devices.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A dispersion compensator comprising:
a first 1XM coupler:
a first MXN coupler coupled to the first 1XM coupler;
a second MXN coupler coupled to the first MXN coupler; and
a second 1XM coupler coupled to the second MXN coupler;
wherein, M and N are greater than 2, and the coupling ratios of the first MXN coupler, and the second MXN coupler are selected such that the dispersion compensator provides a desired amount of dispersion compensation, and
wherein, the first 1XM coupler and the first MXN coupler, and the second MXN coupler and the second 1XM coupler, are respectively coupled using an array of M waveguides having an adjacent waveguide path-length difference of about ΔL, and wherein, the first MXN coupler and the second MXN coupler are coupled using an array of N waveguides having an adjacent waveguide path-length difference of about 2ΔL.

2. The dispersion compensator of claim 1, wherein the coupling ratios of the first and second MXN couplers are selected such that longer wavelengths of light propagated through the couplers are substantially coupled to longer waveguides of the array of N waveguides to provide positive dispersion compensation.

3. The dispersion compensator of claim 1, wherein the coupling ratios of the first and second MXN couplers are selected such that shorter wavelengths of light propagated through the couplers are substantially coupled to longer waveguides of the array of N waveguides to provide negative dispersion compensation.

4. The dispersion compensator of claim 1, wherein the coupling ratios of the first MXN coupler and the second MXN coupler are adjustable to thereby control the amount of dispersion provided by the dispersion compensator.

5. The dispersion compensator of claim 1, wherein the first MXN coupler and the second MXN coupler each include an adjustable lens means for controlling the coupling ratio of the MXN coupler.

6. The dispersion compensator of claim 5, wherein the adjustable lens means each comprise a thermo-optic lens.

7. The dispersion compensator of claim 5, wherein the adjustable lens means each comprise a plurality of phase shifters.

8. The dispersion compensator of claim 1, further comprising a half-wave plate operatively coupled between the first and second MXN couplers such that the dispersion compensator provides substantially polarization-independent dispersion compensation.

9. A dispersion compensator comprising:
a first 1XM coupler;
a first MXN coupler coupled to the first 1XM coupler;
at least one NXN coupler(s) coupled in series to the first MXN coupler;
a second MXN coupler coupled to the at least one NXN coupler(s); and
a second 1XM coupler coupled to the second MXN coupler;
wherein the first 1XM coupler and the first MXN coupler, and the second MXN coupler and the second 1XM coupler, are respectively coupled using an array of M waveguides having an adjacent waveguide path-length difference of about ΔL; and
wherein the first and second MXN couplers are respectively coupled to the at least one NXN coupler(s) using an array of N waveguides having an adjacent waveguide path-length difference of about 2ΔL; and
wherein the at least one NXN coupler(s) are coupled using an array of N waveguides having an adjacent waveguide path-length difference of about 2 μL; and
wherein the coupling ratios of the first MXN coupler, the at least one NXN coupler(s), and the second MXN coupler are selected such that the dispersion compensator provides a desired amount of dispersion compensation.

10. The dispersion compensator of claim 9, wherein the coupling ratios of the first and second MXN couplers are selected such that longer wavelengths of light propagated through the MXN couplers to the at least one NXN coupler(s) are substantially coupled to longer waveguides of an array of N waveguides to provide positive dispersion compensation.

11. The dispersion compensator of claim 9, wherein the coupling ratios of the first and second MXN couplers are selected such that shorter wavelengths of light propagated through the MXN couplers are substantially coupled to longer waveguides of an array of N waveguides to provide negative dispersion compensation.

12. The dispersion compensator of claim 9, wherein the coupling ratios of the at least one NXN couplers are selected such that longer wavelengths of light propagated through the at least one NXN coupler(s) are substantially coupled to longer waveguides of an array of N waveguides coupled to the at least one NXN coupler(s) to provide positive dispersion compensation.

13. The dispersion compensator of claim 9, wherein the coupling ratios of the at least one NXN coupler(s) are selected such that shorter wavelengths of light propagated through the at least one NXN coupler(s) are substantially coupled to longer waveguides of an array of N waveguides coupled to the at least one NXN coupler(s) to provide negative dispersion compensation.

14. The dispersion compensator of claim 9, wherein the first MXN coupler, the at least one NXN coupler(s), and the second MXN coupler are adjustable to thereby control the amount of dispersion provided by the dispersion compensator.

15. The dispersion compensator of claim 14, wherein the first MXN coupler and the second MXN coupler are driven with a drive signal $s+s_o$, and the at least one NXN coupler(s) are driven using a drive signal $\gamma s+s_o$, where s is the drive signal strength, so is the strength of the drive signal which provides zero dispersion compensation, and $\gamma \geq 1$.

16. The dispersion compensator of claim 9, wherein the first MXN coupler, the at least one NXN coupler(s), and the second MXN coupler each include adjustable lens means for controlling the coupling ratios of the couplers.

17. The dispersion compensator of claim 16, wherein the adjustable lens means each comprise a thermo-optic lens.

18. The dispersion compensator of claim 16, wherein the adjustable lens means each comprise a plurality of phase shifters.

19. The dispersion compensator of claim 9, further comprising a half-wave plate operatively coupled between the at least one NXN coupler(s) such that the dispersion compensator provides substantially polarization-independent dispersion compensation.

* * * * *